United States Patent [19]

Ward et al.

[11] 4,231,488
[45] Nov. 4, 1980

[54] CONTAINER CLOSURE SPOUT CONSTRUCTION AND METHOD OF FORMING SAME

[76] Inventors: William H. Ward, Kinnelon, N.J. 07405; William H. Ward, Jr., 171A Overmount Ave., West Paterson, N.J. 07424

[21] Appl. No.: 30,406

[22] Filed: Apr. 16, 1979

[51] Int. Cl.³ .................................................. B65D 41/04
[52] U.S. Cl. ........................... 220/288; 222/568; 285/201; 219/121 LD; 220/85 SP
[58] Field of Search ........................... 220/288, 85 SP; 285/201; 222/566, 568; 219/121 LC, 121 LD

[56] References Cited

U.S. PATENT DOCUMENTS

| | | | |
|---|---|---|---|
| 1,190,802 | 7/1916 | Rosenfeld | 222/568 X |
| 1,205,666 | 11/1916 | Rosenfeld | 272/568 X |
| 1,933,772 | 11/1933 | Stresau | 285/201 |
| 3,026,130 | 3/1962 | Morrell | 285/201 |

*Primary Examiner*—George T. Hall

[57] ABSTRACT

Container closure spout construction, e.g. for incorporation in a metal drum container, including a container wall portion having a spout aperture, and a closure spout member having a peripheral substantially transversely extending flange portion and, preferably integral therewith, an intermediate substantially axially extending tubular, e.g. internally threaded central hollow cylindrical, portion defining a closure spout opening within the flange portion and adapted to receive removably a cooperating closure element such as a plug or cap thereat, in which the spout member is disposed at the spout aperture in engagement with the adjacent marginal portion of the container wall portion thereat, and a high energy concentration beam, e.g. laser beam, produced weld seam, preferably continuously, interconnects the spout member with the container wall portion along such adjacent marginal portion;

the weld seam preferably being provided by subjecting the site of interconnection of the component, e.g. metal, parts to the operative locally confined heat fusion action of a laser beam or electron beam sufficient to form a corresponding, e.g. metal, weld seam bond thereat.

30 Claims, 9 Drawing Figures

CONTAINER CLOSURE SPOUT CONSTRUCTION AND METHOD OF FORMING SAME

The present invention relates to a container closure spout construction and forming method therefor, and more particularly to such a construction for incorporation in a metal drum container, utilizing a high energy concentration beam to interconnect the corresponding spout construction parts by forming a heat fusion weld seam bond at the site of interconnection therebetween.

Closures or spouts for steel drums or other containers of the type used for storage or shipment of liquids, powders, granulated substances, etc., are customarily provided in the form of a tubular flange spout or female threaded fitting which is affixed in an aperture in the primary part such as the upper head end of the drum or container. Today, and for roughly the last fifty years, the ¾" and 2" closures commonly used for 15, 30 and 55 gallon tight head steel drums, are and have been provided as tubular threaded spout fittings or flanges pressed into the drum stock by cumbersome means including a mechanical press and cooperating dies. Specifically, the connection is made by a relatively costly process which involves reforming the fitting or flange under many tons of pressure while disposed in the ¾" or 2" aperture of the drum stock.

However, because of the dimensional differential between the thickness of the drum stock, e.g. 18 to 22 gauge, and that of the fitting or flange, e.g. 14 to 16 gauge, normally used, it has generally been necessary to compensate therefor by including an integral seal or gasket between these parts during the formation of the closure or spout. In this way, an acceptable connection which is leak proof to liquids can be attained. Nevertheless, the need for such gaskets places further restrictions on the fabricating process inasmuch as the material for the gaskets must be selected so as to be inert to the liquid or other products intended to be stored or shipped in the drums as well as durable in terms of repeated usage of the drums.

In actuality, the nature of the construction of pressed in fittings with their integral gaskets has posed a constant problem for the new drum manufacturer in that very close surveillance is required during press insertions to assure proper closure formation due to the close tolerances which must be observed for obtaining seviceable leakproof joints. It has likewise posed a significant problem for the drum reconditioning industry because the gaskets of such closure fittings are prone to leakage during the reconditioning processing and repair thereof is difficult.

In this regard, about half of the drums which are reconditioned contain a resinous lining on their interior. Most reconditioners clean such drums by resort to an incineration process at high temperature, e.g. about 1700° F. As a result, in addition to removing such linings by incineration, the high temperature process simultaneously tends to carbonize the integral seal or gasket between the flange fitting and the drum stock, thereby destroying its leakproof condition. Since steel drums are reconditioned in the order of magnitude of about 100,000,000 per year, the problem of integral gasket leakage brought about by reconditioning alone is very pronounced. However, no practical solution to the gasket leakage and disintegration problems as discussed has yet been devised.

It will be realized, in this regard, that such closures or spouts are not normally formed integrally from the sheet of material constituting the primary part of the drum or container, such as the end or lid of the drum, because the applicable fabrication procedure has been generally found to be impractical as well as beyond feasibility from an economic standpoint, even though resort to such integral formation might otherwise minimize leakage problems. Hence, in opting for the more economical provision of closures or spouts formed from a separate piece of metal material which must be engaged with the edge of the container spout aperture in a more or less frictional or press fit, offsetting factors such as the need for observing close tolerances between the parts, contending with uneven or non-flush arrangements of the interconnected parts, providing special fabrication steps such as spinning or turning the parts to achieve a smooth and even adequate connection therebetween, and the like, are instead involved. Moreover, leakage resulting from variable conditions extant during and after press and die set up for the fabrication, from reconditioning processing, and from mechanical stress causing detachment of the connected parts during normal rough handling in use, remains a problem.

Furthermore, even in those cases where an integral seal or gasket is omitted, the drum stock around the spout aperture must still be peened or swaged under pressure outwardly against the tubular flange spout or female threaded fitting to blend and press the parts together by way of mere mechanical joinder or friction fit engagement. However, aside from the pertinent above discussed drawbacks, such mere mechanical joinder is by its very nature prone to detachment and leakage at the press fit interconnection. This is substantially equally true in the case where a peripherally fluted or multiple eared or winged flange spout or fitting is used instead and the spout aperture is specially formed with a recess into which the flutes or ears outwardly extend for mechanical joinder thereat under the action of pressure provided for example by an appropriate press and cooperating die set up.

It is among the objects and advantages of the present invention to overcome the foregoing drawbacks and deficiencies of the prior art, and to provide a closure spout construction for a drum or other container, such as a steel drum, which is relatively inexpensive to fabricate from readily available components using a minimum of steps, robust and durable in use, and thus capable of long lasting service under rough handling and repeated reconditioning at comparatively severe conditions without leakage or detachment of the closure spout from the corresponding drum or container part to which it is connected, and furthermore which is formed without the need for any extraneous integral seal or gasket, attendant high tonnage pressure mechanical press and cooperating dies, close attention to manufacturing tolerances as between the components even where they possess different gauge thicknesses, or provision for special fabrication steps such as spinning or turning of the parts to achieve smooth and even tight connection therebetween.

It is among the additional objects and advantages of the present invention to provide such a closure spout construction which permits the utilization of geometric designs and shapes for the subject components that generally obviate superfluous uneven transitional areas in the adjacent interior wall portion of the drum or other container, and instead enable relatively flush interior joints to be utilized for the most part without troublesome crevices or the like, thus allowing generally more complete drainage of the container to be effected.

It is among the further objects and advantages of the present invention to provide such a closure spout construction in which the interconnected components are joined together by an extremely strong bond constituted as an intimately interfused or interwelded connection forming a preferably continuous hermetically sealing metal to metal, accurate locally confined, weld seam along the common interabutting portions of the components, and in which such weld seam is readily, rapidly and accurately attained by applying a high energy concentration radiation beam such as a laser beam or electron beam or the like to the corresponding metal components along the confined local site of interconnection therebetween for attaining an enhanced positive, safe, reliable and virtually unbreakable physical and/or fusion blended attachment between the two main component parts.

Other and further objects and advantages of the present invention will become apparent from a study of the within specification and accompanying drawings, in which:

Broadly, according to one aspect of the present invention, a container closure spout construction for a drum or other container is contemplated, which comprises a container wall portion having a spout aperture defined therethrough, a closure spout member having a substantially axially extending tubular portion defining a closure spout opening adapted to receive removably a cooperating closure element thereat, the spout member being disposed at the spout aperture in engagement with the adjacent marginal portion of the container wall portion thereat, and a high energy concentration beam produced weld seam interconnecting the spout member with the container wall portion along such adjacent marginal portion.

Desirably, the weld seam is a continuous weld seam forming a continuous, preferably hermetically sealing, interconnection between the spout member and the continuous wall portion along such adjacent marginal portion. The tubular portion of the spout member is advantageously internally threaded and thus is adapted to receive removably a cooperating externally threaded closure element such as a plug or cap thereat. The tubular portion may conveniently be provided in the form of an internally threaded hollow cylindrical portion.

According to one embodiment of the invention, an external peripheral seating shoulder or groove is defined at an axial end portion of the tubular portion, the seating shoulder or groove is in operative engagement with the adjacent edge of the spout aperture of the container wall portion, and the weld seam extends as a peripheral weld seam located at the resulting interface between the seating shoulder or groove and the adjacent marginal portion of the container wall portion thereat. Conveniently, such axial end portion of the tubular portion is suitably provided with a substantially transversely extending end face, and an indexing groove or guide is optionally defined in the end face adjacent to and inwardly of the seating shoulder or groove as a reference guide for providing the weld seam along such seating shoulder or groove.

According to a further embodiment of the invention, the closure spout member is provided with a peripheral substantially transversely extending flange portion and the tubular portion is in the form of an intermediate substantially axially extending tubular portion defining the closure spout opening within the flange portion. In particular, the flange portion may be located at one axial end portion of the tubular portion and be provided with a peripheral seating shoulder or groove defined therein which is in engagement with the adjacent edge of the spout aperture of the container wall portion. Hence, the weld seam may accordingly extend as a peripheral weld seam located at the resulting interface between the seating shoulder or groove and the adjacent marginal portion of the container wall portion thereat. Conveniently, an indexing groove or guide is optionally defined in the flange portion adjacent to and inwardly or medially of the seating shoulder or groove as a reference guide for providing the weld seam along such seating shoulder or groove.

In particular, in this regard, the flange portion may be externally disposed with respect to the container wall portion such that the seating shoulder or groove extends inwardly into engagement with the adjacent edge of the spout aperture. Alternatively, the flange portion may be internally disposed with respect to the container wall portion such that the seating shoulder or groove extends outwardly into engagement with the adjacent edge of the spout aperture.

According to a still further embodiment of the invention, in which such a flange portion is provided, the flange portion is located at one axial end portion of the tubular portion such that the periphery of the flange portion is disposed in overlapping abutting surface engagement with the adjacent marginal portion of the container wall portion thereat. In turn, the weld seam extends as a peripheral weld seam located at the resulting interface between the periphery of the flange portion and such adjacent marginal portion of the container wall portion. In this instance, also, an indexing groove or guide may be defined in the flange portion adjacent to and inwardly of the periphery thereof for such reference guide purposes.

As desired, according to the present invention, the tubular portion may extend inwardly through the spout aperture and the flange portion may in turn be externally disposed with respect to the container wall portion. Alternatively, the tubular portion may extend outwardly through the spout aperture and the flange portion may in turn be internally disposed with respect to the container wall portion. Moreover, the tubular portion and flange portion may both be externally disposed with respect to the container wall portion or may both be internally disposed with respect thereto, according to still further permitted alternative arrangements herein, as the artisan will appreciate.

Broadly, according to a further aspect of the present invention, a method of forming a container closure spout construction for a drum or other container is contemplated which comprises arranging a closure spout member having a substantially axially extending tubular portion defining a closure spout opening adapted to receive removably a cooperating closure element thereat, with respect to a container wall portion having a spout aperture defined therethrough, such that the spout member is disposed at the spout aperture in engagement with the adjacent marginal portion of the container wall portion thereat, and applying a high energy concentration welding beam along the corresponding engagement portions thereof sufficient to produce a weld seam interconnecting the spout member with the container wall portion along such adjacent marginal portion.

Preferably, the weld seam is produced as a continuous hermetically sealing weld seam forming a continuous fusion interconnection between the spout member and the container wall portion along such adjacent marginal portion. The construction is desirably in the form of a metal drum container closure spout construction and the container wall portion is suitably adapted to be or is incorporated in a metal drum container.

Favorably, the weld seam is produced by subjecting the site of interconnection of the spout member with the container wall portion along such adjacent marginal portion to the operative locally confined heat fusion action of a laser beam or electron beam sufficient to form a corresponding metal to metal, accurate locally confined, weld seam bond thereat. The container and closure spout construction are preferably formed of steel and the weld seam is correspondingly a steel weld seam.

Figure 1:
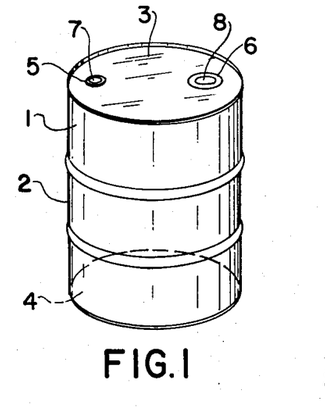
FIGS. 1 and 2 are schematic perspective views on a reduced scale of exemplifications of steel drums in which closure spout constructions according to the invention are incorporated.

Referring to the drawing, FIG. 1 shows a container 1 in the form of a steel or other metal drum of the conventional type, e.g. having a 15, 30 or 55 gal. capacity, provided with the usual tubular or cylindrical side wall 2 and radial or transverse end walls or top and bottom walls 3 and 4. Incorporated into the top wall 3 of container 1 are variously sized metal drum container closure spout constructions according to the invention, including a ¾" closure spout construction 5 and a 2" closure spout construction 6.

These closure spout constructions are conveniently located in any desired radial position on the container and may possess any desired spout flow cross sectional size and configuration, with each being sealed off by a suitable plug or cap 7 and 8 as the case may be in the customary manner. Naturally, only one such construction need be provided, or more than two may be appropriately included, depending upon the circumstances of intended use.

The particular so-sealed container having a closure spout construction according to the invention is advantageously suitable for storing and shipping flowable substances such as liquids, powders, granulates, etc. and is able to withstand rough handling when empty as well as when filled and also when exposed to extreme changes in temperature conditions, all without either leakage of the container contents from the drum or leakage or seepage of extraneous substances and contaminants into the container interior. When the closure spout construction of the invention is incorporated into a conventional container and sealed by a plug or cap in the normal way, a leakproof environment exists within the container which is essentially hermetically sealed off from the container exterior.

Figure 2:
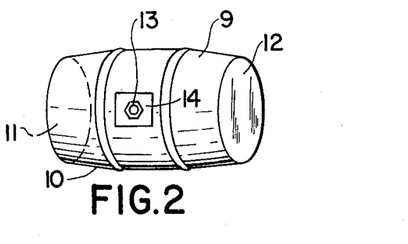

FIG. 2 shows a similar arrangement to that in FIG. 1 in which the container is in the form of a keg shaped steel or other metal drum 9, provided with a somewhat rounded or double tapered tubular side wall 10 and radial or transverse end walls 11 and 12. In this embodiment, the container closure spout construction 13 according to the invention is located in a more or less flattened area 14 in side wall 10.

Figure 3:
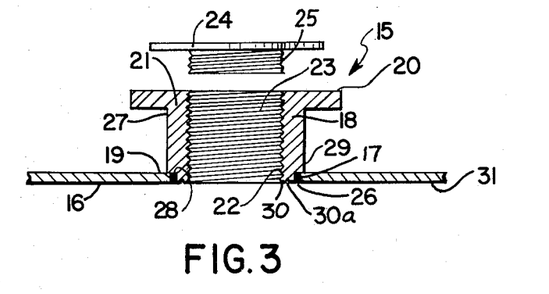
FIG. 3 is a schematic sectional view of one embodiment of the closure spout construction according to the invention, showing a more or less flush peripheral seating shoulder butt weld seam connection arrangement between the corresponding components and a removable closure element for the spout.

In accordance with the particular embodiment shown in FIG. 3, a flush peripheral seating shoulder butt weld type metal drum container closure spout construction 15 is shown, in which the appropriate transverse wall portion 16, of or adapted to be incorporated in the container, e.g. of the type shown in FIG. 1 or FIG. 2, is provided with a spout aperture 17 for operatively receiving the flange closure spout member 18 so that the same is disposed at the aperture 17 in suitable operative loose fit engagement with the adjacent marginal or edge portion 19 of the container wall portion 16 thereat. Spout member 18 desirably includes a peripheral or circumferential substantially transversely extending flange portion 20 and, preferably integrally therewith, an intermediately or centrally positioned substantially axially extending tubular or hollow cylindrical portion 21.

Tubular portion 21 is suitably provided with internal or female threads 22 and defines a closure spout opening 23 within flange portion 20. Thus, the conventional closure element, such as a plug or cap 24 correspondingly provided with external or male threads 25, may be removably received in spout opening 23 for completing the sealing condition of the closable container.

Advantageously, a preferably continuously extending high energy concentration beam produced weld seam 26 interconnects the spout member 18 with the container wall portion 16 along the adjacent marginal portion 19 of the container wall portion 16 surrounding the spout aperture 17. Such weld seam 26 constitutes a substantially uniform, continuous and intimate fusion interconnection of the abutting portions of the interconnected parts along their selectively extended and/or extensive interfacial common extent, and is produced by applying a conventional laser beam or electron beam to the local site of interconnection. This fusion together of the adjacent parts provides relatively the strongest type bond therebetween and eliminates any need for spinning or turning the parts to insure a tight mechanical connection as in the case of a conventional press fitting arrangement.

In the flush butt type embodiment of FIG. 3, the flange portion 20 is located at one axial end portion 27 of the tubular portion 21, and an external peripheral or circumferential seating shoulder or groove 28 is defined at the other or opposite axial end portion 29 of the tubular portion 21. Of course, tubular portion 21 is of suitable selective wall thickness sufficient to accommodate seating shoulder 28 therein. Seating shoulder 28 in turn is preferably sized and shaped for operative relatively loose or snug fit engagement, as desired, with the adjacent internal edge of the spout aperture 17 along marginal portion 19, and upon applying the high energy concentration radiation beam thereto the weld seam 26 is formed and precisely located as a selectively confined local linear bond along the seating shoulder and marginal portion facial and subsurface mass portions thereat. The weld seam 26 extends as a convenient peripheral or circumferential butt weld seam and is located internally at the resulting interface between the seating shoulder 28 and the adjacent marginal portion 19 of container wall portion 16 thereat.

In fact, the axial end portion 29 is desirably provided with a substantially transversely extending end face 30, with respect to which the seating shoulder 28 is selectively axially located in dependence upon the thickness of the container wall portion 16, such that the seating shoulder 28 is sufficiently close to the end face 30 to provide the substantially flush relation sought between such end face 30 and the corresponding face 31 of the container wall portion 16 at the adjacent marginal portion 19. Hence, the weld seam 26 advantageously extends substantially flushly and evenly along such end faces 30 and 31 and provides a relatively smooth and uniform fusion transition therebetween rather than an abrupt step or lap relation between these container wall portion and flange closure spout member components or parts.

Optionally, an indexing line or guide 30a, e.g. in the form of a shallow or slight V-groove or the like, is desirably defined in end face 30, i.e. adjacent to and medially or radially inwardly of the seating shoulder 28. This indexing line 30a advantageously serves as a convenient reference guide for the laser beam or electron beam equipment used to provide the weld seam 26 along the seating shoulder 28. Specifically, the provision for such indexing line or guide at a reference location appropriately adjacent the welding site, permits the interconnection of the parts to be accomplished more efficiently by automated welding techniques.

However, since the weld seam 26 will normally be produced from the inner side of the container wall portion, i.e. by directing the high energy concentration radiation beam upwardly at the adjacent facing areas of the seating shoulder 28 and marginal portion 19 at end face 30 and adjacent face 31, the embodiment of FIG. 3 will in turn be fabricated prior to incorporation thereof into the remainder of the container for completion of the latter, as the artisan will appreciate. Specifically, such interconnection of the appropriate parts will thus be carried out prior to attachment of the container wall portion 16, e.g. wall 3 of FIG. 1 or wall 10 or flattened area 14 of FIG. 2, to the remainder of the container.

This flush interior positional orientation and spatial interconnection arrangement as shown in FIG. 3 completely avoids crevices and dead spaces within the container and accordingly permits essentially complete drainage or discharge of the container contents whether liquid or solids particulate in nature. The same is effectively attainable even where close tolerances are not critically observed as between the dimensions of the spout aperture and the seating groove.

This closure spout construction therefore eliminates the need for an extraneous integral seal or gasket between the parts in question or the employment of high tonnage press and cooperating die reforming manipulations, or the provision for specially fluted or multiple eared or winged flange type fittings for press fit or friction fit engagement precisely with the container aperture edge. At the same time, the previous leakage and other problems and deficiencies of conventional constructions are obviated.

Figure 4:
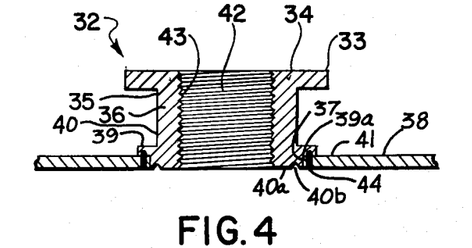
FIG. 4 is a schematic sectional view of another embodiment of the closure spout construction according to the invention, showing a peripheral flange seating shoulder butt weld seam connection arrangement between the corresponding components.

FIG. 4 illustrates another particular embodiment of the invention in which the corresponding metal drum container closure spout construction 32 is provided with a peripheral flange seating shoulder rabbet-like butt weld seam interconnection of the components.

The flange portion 33 of the spout member 34 is located at one axial end portion 35 of the tubular or hollow cylindrical portion 36, and the tubular portion extends inwardly into the spout aperture 37 of the appropriate transverse container wall portion 38.

More particularly, a second or further peripheral substantially transversely extending flange portion 39 is provided at the other or opposite axial portion 40 of the tubular portion 36 which contains an external peripheral, e.g. circular, seating shoulder or step 39a defined therein and which is axially outwardly or downwardly directed in facing relation to the adjacent marginal portion 41 of the container wall portion 38 and in remote relation to the first flange portion 33. Seating shoulder 39a thus extends inwardly into engagement with the adjacent edge of the spout aperture 37 in more or less rabbet-like disposition.

For this purpose, the second flange portion 39 is suitably provided in a slightly greater thickness than that of the corresponding container wall portion 38, thereby assuring flush accommodation of the full extent of the spout aperture 37 thereat without the creation of any interior recess. Nevertheless, the second flange portion 39 may be alternatively provided in a less preferred modification with a reduced thickness and a corresponding seating shoulder or step of shallow depth, in which case a slight step will occur between the internal surface of the container wall portion 38 thereat and the end face 40a at axial end portion 40 of tubular portion 36 (cf. FIG. 7).

In this regard, the second flange portion 39 is externally disposed with respect to the container wall portion 38 and the remainder thereof adjacent to the seating shoulder 39a serves to reinforce the connection in a manner similar to the seating shoulder and container wall portion interfacial abutment relationship shown in the embodiment of FIG. 3. Of greater significance is the fact that while it is preferable to maintain these parts in close fit relation, this is not particularly necessary because their rabbet-like disposition in view of their transversely extended overlapping relationship consequent the presence of the second flange portion permits wide tolerance to be accommodated without difficulty in a manner similar to but possibly more pronounced than the butt weld seam relationship of the parts shown in the embodiment of FIG. 3.

Of course, in the embodiment of FIG. 4, the spout opening 42 in the tubular portion 36 is similarly provided with internal or female threads 43 to receive removably a closure element (not shown) for sealing the container in the usual way as indicated in FIG. 3.

In this embodiment also, the weld seam 44 extends as a convenient peripheral or circumferential butt weld seam and is located internally of the container at the resulting interface between the seating shoulder 39a and the adjacent marginal portion 41 of the container wall portion 38 thereat. An indexing line or guide 40b, e.g. in the form of a shallow or slight V-groove or the like, is also desirably defined in the second flange portion 39, as at axial end face 40a, i.e. adjacent to and medially or radially inwardly of the seating shoulder 39a. This indexing line 40b advantageously serves in the same way as a a convenient reference guide for the laser beam or electron beam equivalent used to provide the weld seam along the seating shoulder 39a.

The rabbet-like seating shoulder or step joint butt weld seam 44 advantageously provides a relatively smooth and uniform fusion transition between the parts. The seating shoulder construction may therefore be desirably selectively dimensioned with regard to the thickness differential between the second flange portion 39 and the container wall portion 38 so as to minimize or avoid completely crevices or dead spaces within the container. The selectively confined local linear butt weld seam bond favorably constitutes a substantially uniform, continuous and intimate fusion interconnection of the abutting and subsurface mass portions of the interconnected parts along their selectively extended and/or extensive interfacial common extent.

Weld seam 44 is conveniently produced by application of a conventional laser beam or electron beam to the local site of interconnection, and especially because of the provision for an appropriate indexing line or guide at a reference location adjacent to such site, the same is suitable for automated welding as in the case of the embodiment of FIG. 3.

Accordingly, since the weld seam 44 will normally be produced from the inner side of the container wall portion, i.e. by directing the high energy concentration radiation beam upwardly at the underside of the marginal portion 41, the embodiment of FIG. 4 will likewise be fabricated prior to incorporation thereof into the remainder of the container for completion of the latter, as the artisan will appreciate.

In this instance, also, the corresponding fusion together of the adjacent parts which occurs as a result provides in equivalent manner relatively the strongest type bond therebetween, likewise eliminating the need for spinning or turning of the parts to achieve to insure a tight mechanical connection in the manner necessitated for a conventional press fitting arrangement.

Figure 5:
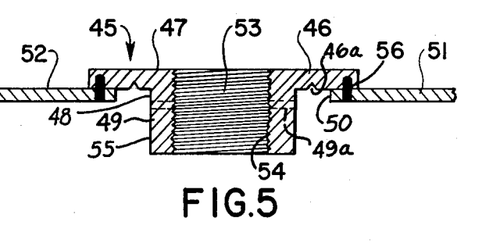
FIG. 5 is a schematic sectional view of a further embodiment of the closure spout construction according to the invention, showing a peripheral flange lap weld seam connection arrangement in which the tubular spout portion extends inwardly into the container aperture.

FIG. 5 concerns a further particular embodiment of the invention in which the corresponding metal drum container closure spout construction 45 is provided with a simple lap weld seam interconnection of the components.

The flange portion 46 of the spout member 47 is located at one axial end portion 48 of the tubular or hollow cylindrical portion 49, and the tubular portion extends inwardly through the spout aperture 50 of the appropriate transverse container wall portion 51, preferably in close fit relation therewith, although this is understandably not particularly necessary or critical as shown in FIG. 5. Thus, the flange portion 46 is externally disposed with respect to the container wall portion 51 and at least its peripheral portion is arranged in overlying and overlapping abutting surface engagement with the adjacent marginal portion 52 of the container wall portion thereat surrounding the spout aperture 50.

Here also, the spout opening 53 in the tubular portion 49 is appropriately provided with internal or female threads 54 to accommodate a closure element (not shown) for sealing the container in the customary manner as indicated in FIG. 3.

The axial extent of the tubular portion 49 may be selectively dimensioned so that the same projects inwardly into the container interior to the degree desired with the other or opposite end portion 55 thereof terminating more or less closely to the inner surface of the container wall portion 51. Hence, no more than the minimum length of the spout member 47 necessary to cover over the thickness dimension of the container wall portion 51 need be provided, yet optionally the tubular portion 49 may have a greater length if and as desired, e.g. as shown in FIG. 5, to guide more easily as a spout the flow of the contents into and out of the container, and of course appropriately accommodate the closure element.

In the latter event, as shown, tubular portion 49 may be appropriately provided with one or more appropriately spaced drain holes 49a selectively axially positioned at a level correspondingly adjacent to or more or less coincident with the underside of the container wall portion 51 thereat to assure more complete drainage of the container contents, as the artisan will appreciate.

In any case, the weld seam 56 extends as a convenient peripheral or circumferential weld seam and is located at the resulting interface between the periphery of the flange portion 46 and the adjacent marginal portion 52 of the container wall portion 51 thereat. This selectively confined local linear lap joint weld seam bond provides a relatively smooth and uniform fusion transition between the parts, and the construction may be selectively dimensioned with regard to the axial differential between end portion 55 and the inner surface of the container wall portion 51, as especially enhanced by the presence of the drain holes 49a, so as favorably to minimize the effect of or avoid pronounced crevices and dead spaces within the container.

The lap joint weld seam 56 advantageously constitutes a substantially uniform, continuous and intimate fusion interconnection of the abutting and subsurface mass portions of the interconnected parts along their selectively extended and/or extensive interfacial common extent.

Weld seam 56 is likewise produced by application of a conventional laser beam or electron beam to the local site of interconnection. The corresponding fusion together of the adjacent parts which occurs as a result provides in the same way relatively the strongest type bond therebetween, equally eliminating the need for spinning or turning of the parts to achieve or insure a tight mechanical connection as in the case of a convenient press fitting arrangement.

Here, also, an indexing line or groove 46a may be provided for the purposes stated above, e.g., in the form of a shallow or slight V-groove or the like in the underside of the flange portion 46, appropriately adjacent to and medially or inwardly of the disposition of the spout aperture 50 thereat, as where the width or diameter of the spout aperture is slightly larger than the outside width or diameter of the tubular portion 49 and exposes an annular surface on the underside of flange portion 46 sufficient to accommodate such indexing line or groove 46a. Any container contents otherwise collecting thereat will be readily recovered through the aforesaid drain holes 49a selectively positioned at a level proximate thereto, as the artisan will appreciate.

In this instance, also, the weld seam 56 will normally be produced from the inner side of the container wall portion, i.e. by directing the high energy concentration radiation beam upwardly at the underside of the marginal portion 52, whereupon the embodiment of FIG. 5 will similary be fabricated prior to incorporation thereof into the remainder of the container for completion of the latter, as the artisan will appreciate.

Figure 6:
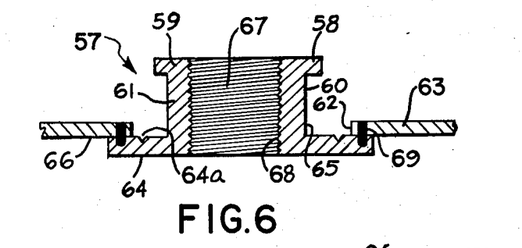
FIG. 6 is a schematic sectional view of still another embodiment of the closure spout construction according to the invention, showing a peripheral flange lap weld seam connection arrangement in which the tubular spout portion extends outwardly from the container aperture.

FIG. 6 relates to an embodiment of the invention in which the corresponding metal drum container closure spout construction 57 is provided with a simple lap weld seam interconnection of the components somewhat corresponding to an inverted form of the analogous arrangement shown in FIG. 5.

The flange portion 58 of the spout member 59 is located at one axial end portion 60 of the tubular or hollow cylindrical portion 61, but in this case the tubular portion 61 extends outwardly through the spout aperture 62 of the appropriate transverse container wall portion 63, although not in close fit relation therewith. This is because in this case flange portion 58 must be able to clear such spout aperture 62 to permit the second or further peripheral substantially transversely extending flange portion 64, which is provided at the other or opposite axial end portion 65 of the tubular portion 61 and which is internally disposed with respect to the container wall portion 63, to be properly positioned with its periphery arranged in underlying and overlapping abutting surface engagement with the adjacent marginal portion 66 of the container wall portion thereat surrounding the spout aperture 62.

Naturally, in this embodiment, the interconnection of the appropriate parts is carried out prior to attachment of the container wall portion 63, e.g. wall 3 of FIG. 1 or wall 10 or flattened area 14 of FIG. 2, to the remainder of the container, as the artisan will appreciate, since the second flange portion 64 is larger than the spout aperture 52 in width and is disposed inwardly thereof.

The spout opening 67 in the tubular portion 61 is suitably provided with internal or female threads 68 to accommodate a closure element (not shown) for sealing the container in the customary manner as indicated in FIG. 3.

In this instance also, the axial extent of the tubular portion 61 may be selectively dimensioned so that the same projects outwardly from the container interior to the desired degree with the one axial end portion 60 carrying the flange portion 58 terminating more or less closely to the outer surface of the container wall portion 63. Therefore, no more than the minimum length of the spout member 59 necessary to cover over the thickness dimension of the container wall portion 63 and conjointly accommmodate the disposition of the external flange portion 58 need be provided, yet optionally the tubular portion 61 may have a greater length if and as desired, e.g. as shown in FIG. 6, to guide more easily as a spout the flow of the contents into and out of the container, and of course appropriately accommodate the closure element.

In any event, the weld seam 69 extends as a convenient peripheral or circumferential weld seam and is located at the resulting interface between the periphery of the second flange portion 64 and the adjacent marginal portion 66 of the container wall portion 63 thereat. This selectively confined local linear inverted lap joint weld seam bond provides a relatively smooth and uniform fusion transition between the parts, and the only internal surface interrption is the slight step between the periphery of the second flange portion 64 and the adjacent inner surface of the container wall portion 63 as selectively determined by the comparatively slight thickness dimension of the second flange portion 64.

Other than this, the lap joint weld seam 69 advantageously constitutes a substantially uniform, continuous and intimate fusion interconnection of the abutting and subsurface mass portions of the interconnected parts along their selectively extended and/or extensive common extent.

Weld seam 69 is of course produced in like manner by application of a conventional laser beam or electron beam to the local site of interconnection. The corresponding fusion together of the adjacent parts which occurs as a result provides in equal manner relatively the strongest type bond therebetween, likewise eliminating the need for any such spinning or turning of the parts to achieve or insure a tight mechanical connection as was heretofore found necessary.

A similar indexing line or groove 64a may be provided for the previously stated purposes, e.g. in the form of a shallow or slight V-groove or the like in the upper side of the second flange portion 64 appropriately adjacent to and medially or inwardly of the disposition of the spout aperture 62 thereat, yet sufficiently removed from the one or first flange portion 58 to permit its use as desired without interference thereat. Although the weld seam 69 will normally be produced from the outer side of the container wall portion, i.e. by directing the welding beam downwardly at the upper side of marginal portion 66 in contrast to the orientation in the embodiments of FIGS. 3 to 5, the embodiment of FIG. 6 must still be fabricated prior to incorporation thereof into the remainder of the container due to the aforesaid dimensional differential between the spout aperture 62 and the second flange portion 64 and the inward disposition of the latter relative to the container wall portion.

Figure 7:
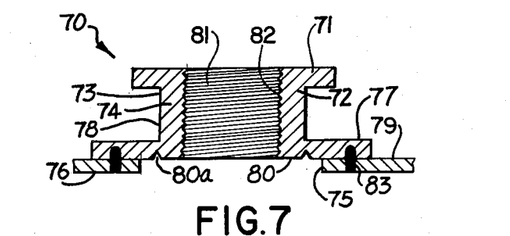
FIGS. 7 and 8 are schematic sectional views of still further embodiments of the closure spout construction according to the invention, showing peripheral flange lap weld seam connection arrangements similar to those of FIGS. 5 and 6.

FIG. 7 relates to an embodiment of the invention in which the corresponding metal drum container closure spout construction 70 is provided with a simple lap weld seam interconnection of the components corresponding to an outwardly disposed form of the arrangement shown in FIG. 6.

The flange portion 71 of the spout member 72 is located at one axial end portion 73 of the tubular or hollow cylindrical portion 74, but in this case the tubular portion 74 is disposed entirely externally of the spout aperture 75 of the appropriate transverse container wall portion 76. The second or further peripheral substantially transversely extending flange portion 77 which is provided at the other or opposite axial end portion 78 of the tubular portion 74 is in turn disposed externally with respect to the container wall portion 76 and its periphery is arranged in overlying and overlapping abutting surface engagement with the adjacent marginal portion 79 of the container wall portion thereat surrounding the spout aperture 75, i.e. at end face 80.

The spout opening 81 in the tubular portion 74 is suitably provided with internal or female threads 82 to accommodate a closure element (not shown) for sealing the container in the customary manner as indicated in FIG. 3.

The axial extent of the tubular portion 74 may be selected as desired since the spout member 72 is completely external to the spout aperture 75, and the step therebetween is in axially outward direction so that outward flow is enhanced and collection and stagnation of container contents thereat will be avoided.

The weld seam 83 extends as a convenient peripheral or circumferential weld seam and is located at the resulting interface between the periphery of the second flange portion 77 and the adjacent marginal portion 79 of the container wall portion 76 thereat. The resultant selectively confined local linear lap joint weld seam bond provides a relatively smooth and uniform fusion transition between the parts, with the only internal surface interruption being the slight step as aforesaid between the periphery of the second flange portion 77 and the adjacent inner surface of the container wall portion 76 and which is of course selectively determined by the comparatively slight thickness dimension of such container wall portion.

Aside therefrom, the lap joint weld seam 83 advantageously constitutes a substantially uniform, continuous and intimate fusion interconnection of the abutting and subsurface mass portions of the interconnected parts along their selectively extended and/or excessive interfacial common extent.

Weld seam 83 is produced by application of a conventional laser beam or electron beams to the local site of interconnection. The corresponding fusion together of the adjacent parts which occurs as a result provides in equal manner relatively the strongest type bond therebetween, whereby to eliminate the need for any spinning or turning of the parts to achieve or insure a tight mechanical connection as was found necessary in the past.

By providing similarly the indexing line or groove 80a for the previously indicated purposes, e.g. in the form of a shallow or slight V-groove or the like in the underside of the second flange portion 77, i.e. at the end face 80, appropriately adjacent to and medially or inwardly of the disposition of the spout aperture 75 thereat, the weld seam 83 may be produced in the normal way from the inner side of the container wall portion 76. Hence, here also, the embodiment of FIG. 7 will be fabricated prior to incorporation thereof into the remainder of the container for completion of the latter, as the artisan will appreciate, even though the spout member is disposed completely externally of the container wall portion.

Figure 8:
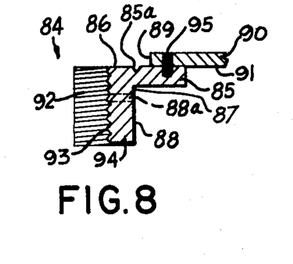

FIG. 8 relates to an embodiment of the invention in which the corresponding metal drum container closure spout construction 84 is provided with a simple lap weld seam interconnection of the components corresponding to an inwardly disposed form of the arrangement shown in FIG. 5 yet somewhat similar to that shown in FIG. 7.

The flange portion 85 of the spout member 86 is located at one axial end portion 87 of the tubular or hollow cylindrical portion 88 and the entirety thereof is disposed completely inwardly of the spout aperture 89 of the appropriate transverse container wall portion 90. Hence, the flange portion 85 is internally disposed with respect to the container wall portion 90, with the peripheral portion thereof arranged in underlying and overlapping abutting surface engagement with the adjacent marginal portion 91 of the container wall portion thereat surround in in the spout aperture 89.

Once more, the spout opening 92 in the tubular portion 88 is appropriately provided with internal or female threads 93 to accommodate a closure element (not shown) for sealing the container in the customary manner as indicated in FIG. 3.

The axial extent of the tubular portion 88 may be selectively dimensioned so as to project further inwardly into the container to the degree desired with the other or opposite end portion 94 thereof terminating at such point as to provide a suitable length to guide as a spout the flow of the contents into and out of the container, and at the same time appropriately accommodate the closure element.

In this regard, tubular portion 88 may be favorably provided with one or more appropriately spaced drain holes 88a selectively axially positioned at a level correspondingly adjacent to or more or less coincident with the underside of the flange portion 85 thereat to assure more complete drainage of the container contents, as the artisan will appreciate.

The weld seam 95 extends as a convenient peripheral or circumferential weld seam and is located at the resulting interface between the periphery of the flange portion 85 and the adjacent marginal portion 91 of the container wall portion 90 thereat. Such selectively confined local linear lap joint weld seam bond provides a relatively smooth and uniform fusion transition between the parts. The construction may be selectively dimensioned with regard to the axial differential between end portion 94 and the inner surface of the container wall portion 90 as especially enhanced by the presence of the drain holes 88a so as favorably to minimize the effect of a avoid pronounced crevices and dead spaces within the container.

The lap joint weld seam 95 advantageously constitutes a substantially uniform, continuous and intimate fusion interconnection of the abutting and subsurface mass portions of the interconnected parts along their selectively extended and/or extensive interfacial common extent.

Weld seam 95 is also produced by application of a conventional laser beam or electron beam to the local site of interconnection. The corresponding fusion together of the adjacent parts which occurs as a result similar provides relatively the strongest type bond therebetween, equally eliminating the need for spinning or turning of the parts to achieve or insure a tight mechanical connection as in the case of a conventional press fitting arrangement.

As before, an indexing line or groove 85a may be provided for the previously stated purposes, e.g. in the form of a shallow or slight V-groove or the like in the upwardly exposed surface of the flange portion 85, appropriately adjacent to and medially or inwardly of the disposition of the spout aperture 89 thereat, as where the latter is large enough in width or diameter to expose an annular surface on the upper end of the tubular portion 88 and/or flange portion 85 sufficient to accommodate such indexing line or groove 85a.

The internally disposed embodiment of FIG. 8 will be fabricated prior to incorporation thereof into the remainder of the container for completion of the latter, as the artisan will appreciate, even though the weld seam 95 is produced from the outer side of the container wall portion 90.

Figure 9:
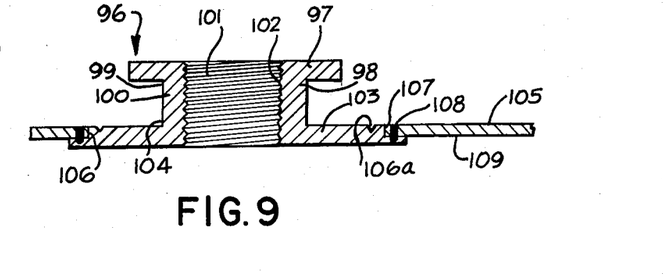
FIG. 9 is a schematic sectional view of yet another embodiment of the closure spout construction according to the invention, showing a peripheral flange seating shoulder butt weld seam connection arrangement similar to that of FIG. 4.

FIG. 9 relates to an embodiment of the invention in which the corresponding metal drum container closure spout construction 96 is provided with a rabbet-like butt weld seam interconnection of the components corresponding to an outwardly disposed form of the arrangement shown in FIG. 4 yet similar to that shown in FIG. 6.

The flange portion 97 of the spout member 98 is located at one axial end portion 99 of the tubular or hollow cylindrical portion 100, and the spout opening 101 is similarly provided with threads 102 as in the embodiment of FIG. 4. However, the second or further flange portion 103 at the other or opposite axial end portion 104 of the tubular portion 100 is internally disposed with respect to the container wall portion 105 such that the external peripheral, e.g. circular, seating shoulder or step 106 defined therein, and which is axially inwardly or upwardly directed in relation to the first flange portion 97, extends outwardly into engagement with the adjacent edge of the spout aperture 107 of the container wall portion 105.

The second flange portion 103 and spout aperture 107 are of optionally greater transverse width or diameter than the flange portion 97 in this embodiment, similar to the corresponding dimensions of these portions in the embodiment of FIG. 6. On the other hand, like the embodiments of FIGS. 3 and 4, the rabbet-like disposition of the parts permits wide tolerances to be accommodated without difficulty, although by virtue of their overlapping construction even wider tolerances may be enjoyed in regard to the embodiments of FIGS. 5, 6, 7 and 8.

In this case, the weld seam 108 extends as a peripheral or circumferential butt weld seam located externally of the container at the resulting interface between the seating shoulder 106 and the adjacent marginal portion 109 of the container wall portion 105 thereat. The indexing line or guide 106a, similarly defining a V-groove or the like in the second flange portion 103, is disposed adjacent to and medially or radially inwardly of the seating shoulder 106 to provide the desired reference guide for producing the weld seam along the seating shoulder, e.g. by way of appropriate automated welding techniques, as aforesaid.

The rabbet-like seating shoulder or step joint butt weld seam bond similarly provides a desired relatively smooth and uniform fusion transition between the component parts and permits selective dimensioning of the parts for utilization despite wide tolerances. The selectively confined local linear butt weld seam 108 thus favorably constitutes a substantially uniform, continuous and intimate fusion interconnection of the abutting and subsurface mass portions of the interconnected parts along their selectively extended and/or extensive interfacial common extent.

Weld seam 108 is likewise produced by application of a conventional laser beam or electron beam to the local site of interconnection, favorably using in this case also the indexing guide 106a at a reference location adjacent to such site. As a result, the corresponding fusion together of the adjacent parts provides relatively the strongest type bond therebetween in the same way as noted above. Here also, the construction is fabricated prior to incorporation thereof into the remainder of the container for completion of the latter, as the artisan will appreciate, since the second flange portion is partially disposed inwardly of the spout aperture, even though the weld seam 108 is normally produced from the outer side of the container wall portion 105 as in the embodiments of FIGS. 6 and 8.

It will be appreciated that the constructional relationships shown in FIGS. 3 to 9 are exaggerated in dimensional proportions for ease in illustration, and that normally the flange closure spout member will be of more or less uniform thickness throughout both the flange portion or portions and tubular portion thereof, e.g. by fabricating the composite from an integral uniform gauge blank or the like, and that such common thickness will be similar to, although not necessarily the same as, the thickness of the container wall portion with which it is joined by the high energy concentration produced weld seam.

Moreover, different shapes may be utilized for the components as desired, such as by providing the flange portion or portions and/or tubular portion of the spout member of polygonal external shape rather than of circular or cylindrical shape. The spout opening may also optionally be provided with a different flow cross sectional shape, and/or the internal or female threads may be replaced by external or male threads for use with a plug or cap having internal or female threads, or be correspondingly omitted altogether therefrom in favor of some other form of sealing connection with a plug or cap of more or less complemental corresponding configuration, as the artisan will appreciate.

Also, in the case of the embodiments of FIGS. 3, 4, 6, 7 and 9, the flange portions 20, 33, 58, 71 and 97 may be omitted as understandably they are not essential to the invention construction.

Furthermore, while the embodiments of FIGS. 3, 4, 6, 7 and 9 are shown with the spout member extending outwardly from the container wall portion, and those of FIGS. 5 and 8 are shown with the spout member extending inwardly into the spout aperture, the reverse dispositions are also contemplated as correspond to the depictions of these Figures of the drawing individually inverted to show the appropriate upside down versions thereof. In such alternative arrangements, the embodiments of FIGS. 3, 4, 5, 7 and 9 would have to be fabricated prior to incorporation thereof into the remainder of the container for completion of the latter because of the width or diameter dimensional differential between the spout aperture and the pertinent flange portion and/or tubular portion, and apart from that, in the usual and preferred instance where the high concentration radiation energy beam is directed at the container wall portion, as the first, outer or more immediate component in generally rabbet-like or overlying or overlapping covering relation over the adjacent portion of the spout member to be welded thereto, the embodiments of FIGS. 6, 8 and 9 would similarly have to be incorporated into the container body prior to completion of the container whereby to provide access for such type of welding to be conveniently achieved.

Alternatively, however, as the artisan will appreciate, such energy beam can instead be directed at the appropriate exposed or accessible surface of the spout member as such first, outer or more immediate component, e.g. for welding the spout member to a container wall portion already in an existing completed container (cf. FIGS. 5 and 7 and the inverted forms of FIGS. 6, 8 and 9), regardless of which of the two components might be thicker at the weld site.

In view of the nature of the interconnecting weld seam between the abutting portions of the components and the permitted continuous hermetic sealing quality thereof whereby to form a continuous fusion type joinder, advantageously the interconnection site may extend optionally along and throughout the width and/or breadth as well as length of the common abutting extent or facial areas of the parts in blended, coalesced or fused relation or selectively along only a part thereof or in linear contact manner as desired.

Because of the attributes of such a weld seam interfusion of the parts, they need not be precisely fabricated in corresponding dimension, any large tolerances therebetween being readily accommodated by the fact that a strong sealing interconnection will inherently occur at the localized site of their common abutting surface or linear contact portions as subjected to the intense beam heat fusion welding action.

Such weld interconnection is believed generally to extend effectively into the subsurface mass portions at such localized site by reason of the nature of high concentration radiation energy beam source and in turn to be sufficient to permeate the usually thinner container wall portion and reach and enter into the subsurface mass therebeneath of the corresponding relatively thicker flange portion or tubular portion of the spout member being welded thereto for accordingly providing relatively the strongest type bond therebetween.

Basically, therefore, the spout aperture is first made in the container wall portion in question, then the flange closure spout member is inserted loosely in place therethrough or appropriately abuttingly disposed thereat, and finally the two parts are joined together by applying the weld seam therebetween, optionally by use of automated welding techniques, all without the need for close tolerances in the dimensions of the two essential component parts or press fit frictional engagement therebetween, due to the use of the surface to surface abutting inter-facial relationship of the parts at the local linear or confined facial area site of interconnection and the application of a locally linearly confined weld seam continuously therealong.

As the artisan will appreciate, the instant construction and method lend themselves for utilization in new drum or container construction endeavors as well as in the reconditioning and repair of used drum or container constructions, i.e. where a conventional spout member is to be replaced at the spout aperture of the container wall portion, appropriately rehabilitated or refurbished to accept the same, or where a new container wall portion is used to replace an existing one, as the case may be. In the particular case, depending upon the closure spout construction embodiment selected, e.g. among those of FIGS. 1 to 9 herein, including those in inverted orientation according to the stated upside down alternative embodiments, the container wall portion may be employed for fabricating the weld seam interconnection with the spout member prior to incorporation thereof in the remainder of the drum or container being newly produced or reconditioned or repaired, as appropriate.

Surprisingly efficient results are correspondingly easily and economically obtainable according to the present invention because the weld seam is produced by a high energy concentration radiation beam such as is achievable with a conventional laser beam or electron beam under a proper gas shield, e.g. an argoncarbon dioxide mixture.

Thus, a laser (Light Amplification By Stimulated Emission of Radiation) source, for example, provides a high concentration of radiation energy which may be accurately focused and projected into a relatively small area as constituted by the site of interconnection of the parts for producing inherently a localized coalescence or melting of the metal under the extreme temperatures and/or pressures internally imparted and/or generated thereat. In the usual way, the power of the laser beam must be kept within conventional limits, i.e. at a low enough level to prevent undesired plume or vaporization of the metal at the welding site, yet be operatively sufficient to achieve formation of an interfusing weld, under the inherently intense local heating provided by the high energy concentration beam, which desirably hermetically seals the parts along the particular continuous weld joint of appropriate geometric configuration as indicated in FIGS. 3 to 9.

Similar action is achievable using an electron beam for joining the metal parts by appropriate fusion. A beam of electrons is converged and focused in the customary manner inherently to melt the metals being fused at the localized site of interconnection under the corresponding high concentration of radiation energy thereby provided.

Like the laser beam, an electron beam is able to impart and/or generate extreme temperatures and/or pressures as the precise confined or localized site of interconnection as desired.

The method is comparatively simple, economical and rapidly effected, and due to the extremely localized extent of the heating and melting of the abutting metal parts, no significant adverse metallurgical effect on the components is believed to occur. Instead a completely safe, reliable and virtually unbreakable joinder of the two basic parts is obtained.

The appropriate metal to metal welding is preferably suitably carried out, for example, with a high energy concentration radiation beam such as a laser beam provided by conventional photon source welding equipment.

Accordingly, a closure spout construction for a drum or other container is advantageously provided which is relatively inexpensive to fabricate from readily available components using a minimum of stops, which is robust and durable in use, and which is thus capable of long lasting service under rough handling and repeated reconditioning under comparatively severe conditions without leakage or detachment of the closure spout from the corresponding drum or container part to which it is connected.

The construction is favorably formed without the need for any extraneous integral seal or gasket, attendant high tonnage mechanical press and cooperating dies, close attention to manufacturing tolerances as between the components even where they possess different gauge thicknesses, or provision for special fabrication steps such as spinning or turning of the parts to achieve smooth and even adequate mechanical or other connection therebetween.

Furthermore, the construction may be provided in a manner permitting utilization of selective geometric designs and shapes for the subject components, while generally obviating the inclusion of superfluous uneven transitional areas in the adjacent interior wall portion of the container, and instead enabling relatively flush interior joints to be utilized for the most part without troublesome pronounced crevices, which appropriate provision for drain holes where needed, whereby to permit generally more complete drainage of the container to be effected.

In particular, the interconnected components of the construction are advantageously joined together by an extremely strong bond constituted as an intimately interfused or interwelded connection forming a preferably continuous hermetically sealing metal to metal, accurate locally confined, weld seam along the common interabutting portions of the steel or other metal components. This is especially so because the weld seam is attained by applying a high energy concentration radiation beam such as a laser beam or electron beam or the like to the corresponding metal components along the confined local site of interconnection therebetween for providing an enhanced positive, safe, reliable and virtually unbreakable physical and/or fusion blended attachment between the two main components parts.

Such advantageous results, of course, are not obtainable with the usual industrial metal welding techniques as distinguished from the instant use of high energy concentration, i.e. laser beam or electron beam, radiation techniques in particular. Indeed, the instant type of welding specifically achieves interfusion of the abutting portions of the component parts to form a weld seam bond therebetween inherently involving to a certain extent interfusing inclusion of subsurface masses of both of the abutting portions at the weld joint under the localized intense heat generated thereat, a type of welding not heretofore considered pertinent or appropriate for the present purposes in the closure spout drum or other container construction or repair industry.

It will be appreciated that the instant specification and drawings are set forth by way of illustration and not limitation, and that various modifications and changes may be made therein without departing from the spirit and scope of the present invention which is to be limited solely by he scope of the appended claims.

What is claimed is:

1. Container closure spout construction comprising
    a container wall portion having a spout aperture defined therethrough,
    a closure spout member having a substantially axially extending tubular portion defining a closure spout opening adapted to receive removably a cooperating closure element thereat,
    said spout member being disposed at the spout aperture in engagement with the adjacent marginal portion of the container wall portion thereat, and
    a high energy concentration laser beam produced weld seam interconnecting the spout member with the container wall portion along such adjacent marginal portion.

2. Construction according to claim 1 wherein the weld seam is a continuous hermetically sealing weld seam forming a continuous fusion interconnection between the spout member and the container wall portion along such adjacent marginal portion.

3. Construction according to claim 1 wherein the tubular portion is internally threaded and adapted to receive removably a cooperating externally threaded closure element thereat.

4. Construction according to claim 3 wherein the tubular portion is in the form of an internally threaded hollow cylindrical portion.

5. Construction according to claim 1 wherein an external peripheral seating shoulder is defined at an axial end portion of the tubular portion, the seating shoulder is in engagement with the adjacent edge of the spout aperture of the container wall portion, and the weld seam extends as a peripheral weld seam located at the resulting interface between the seating shoulder and the adjacent marginal portion of the container wall portion thereat.

6. Construction according to claim 5 wherein such axial end portion of the tubular portion is provided with a substantially transversely extending end face, and an indexing groove is defined in the end face adjacent to and inwardly of the seating shoulder as a reference guide for providing the weld seam along the seating shoulder.

7. Construction according to claim 1 wherein the closure spout member is provided with a peripheral substantially transversely extending flange portion and the tubular portion is in the form of an intermediate substantially axially extending tubular portion defining the closure spout opening within the flange portion, the flange portion is located at one axial end portion of the tubular portion and is provided with a peripheral seating shoulder defined therein, the seating shoulder is in engagement with the adjacent edge of the spout aperture of the container wall portion, and the weld seam extends as a peripheral weld seam located at the resulting interface between the seating shoulder and the adjacent marginal portion of the container wall portion thereat.

8. Construction according to claim 7 wherein an indexing groove is defined in the flange portion adjacent to and inwardly of the seating shoulder as a reference guide for providing the weld seam along the seating shoulder.

9. Construction according to claim 7 wherein the flange portion is externally disposed with respect to the container wall portion and the seating shoulder extends inwardly into engagement with the adjacent edge of the spout aperture.

10. Construction according to claim 7 wherein the flange portion is internally disposed with respect to the container wall portion and the seating shoulder extends outwardly into engagement with the adjacent edge of the spout aperture.

11. Construction according to claim 1 wherein the closure spout member is provided with a peripheral substantially transversely extending flange portion and the tubular portion is in the form of an intermediate substantially axially extending tubular portion defining the closure spout opening within the flange portion, the flange portion is located at one axial end portion of the tubular portion, the periphery of the flange portion is disposed in overlapping abutting surface engagement with the adjacent marginal portion of the container wall portion thereat, and the weld seam extends as a peripheral weld seam located at the resulting interface between the periphery of the flange portion and such adjacent marginal portion of the container wall portion.

12. Construction according to claim 11 wherein an indexing groove is defined in the flange portion adjacent to and inwardly of the periphery thereof as a reference guide for providing the weld seam therealong.

13. Construction according to claim 11 wherein the flange portion is externally disposed with respect to the container wall portion.

14. Construction according to claim 11 wherein the flange portion is internally disposed with respect to the container wall portion.

15. Container closure spout construction comprising
    a metal drum container provided with a container wall portion having a spout aperture defined therethrough, a flange closure spout member having a peripheral substantially transversely extending flange portion and integral therewith a central substantially axially extending internally threaded hollow substantially cylindrical portion defining a closure spout opening within the flange portion and adapted to receive a cooperating externally threaded closure element thereat, said spout member being disposed at the spout aperture in engagement with the adjacent marginal portion of the container wall portion thereat, and a continuous laser beam produced weld seam substantially continuously interconnecting the spout member with the container wall portion along such adjacent marginal portion.

16. Construction according to claim 15 wherein the flange portion of the spout member is located at one axial end portion of the cylindrical portion thereof, an external peripheral seating shoulder is defined at the other axial end portion of the cylindrical portion, the seating shoulder is in engagement with the adjacent edge of the spout aperture of the container wall portion, and the weld seam extends as a peripheral weld seam located at the resulting interface between the seating shoulder and the adjacent marginal portion of the container wall portion thereat.

17. Construction according to claim 15 wherein the flange portion of the spout member is located at one axial end portion of the cylindrical portion thereof, a further corresponding peripheral substantially transversely extending flange portion is provided at the other axial end portion of such cylindrical portion having an external peripheral seating shoulder defined therein, the further flange portion is externally disposed with respect to the container wall portion, the seating shoulder extends inwardly into engagement with the adjacent edge of the spout aperture of the container wall portion, and the weld seam extends as a peripheral weld seam located internally at the resulting interface between the seating shoulder and the adjacent marginal portion of the container wall portion.

18. Construction according to claim 15 wherein the flange portion of the spout member is located at one axial end portion of the cylindrical portion thereof, a further corresponding peripheral substantially transversely extending flange portion is provided at the other axial end portion of such cylindrical portion having an external peripheral seating shoulder defined therein, the further flange portion is internally disposed with respect to the container wall portion, the seating shoulder extends outwardly into engagement with the adjacent edge of the spout aperture of the container wall portion, and the weld seam extends as a peripheral weld seam located externally at the resulting interface between the seating shoulder and the adjacent marginal portion of the container wall portion.

19. Construction according to claim 15 wherein the flange portion of the spout member is located at one axial end portion of the cylindrical portion thereof, the cylindrical portion extends inwardly through the spout aperture of the container wall portion, the flange portion is externally disposed with respect to the container wall portion, the periphery of the flange portion is disposed in overlapping abutting surface engagement with the adjacent marginal portion of the container wall portion thereat, and the weld seam extends at a peripheral weld seam located at the resulting interface between the periphery of the flange portion and such adjacent marginal portion of the container wall portion.

20. Construction according to claim 15 wherein the flange portion of the spout member is located at one axial end portion of the cylindrical portion thereof, a further corresponding peripheral substantially transversely extending flange portion is provided at the other axial end portion of such cylindrical portion, the cylindrical portion extends outwardly through the spout aperture of the container wall portion, the further flange portion is internally disposed with respect to the container wall portion, the periphery of the further flange portion is disposed in overlapping abutting surface engagement with the adjacent marginal portion of the container wall portion thereat, and the weld seam extends as a peripheral weld seam located at the resulting interface between the periphery of the further flange portion and such adjacent marginal portion of the container wall portion.

21. Construction according to claim 15 wherein the flange portion of the spout member is located at one axial end portion of the cylindrical portion thereof, a further corresponding peripheral substantially transversely extending flange portion is provided at the other axial end portion of such cylindrical portion, the spout member is externally disposed with respect to the container wall portion, the periphery of the further flange portion is disposed in overlapping abutting surface engagement with the adjacent marginal portion of the container wall portion thereat, and the weld seam extends as a peripheral weld seam located at the resulting interface between the periphery of the further flange portion and such adjacent marginal portion of the container wall portion.

22. Construction according to claim 15 wherein the flange portion of the spout member is located at one axial end portion of the cylindrical portion thereof, the spout member is internally disposed with respect to the container wall portion, the periphery of the flange portion is disposed in overlapping abutting surface engagement with the adjacent marginal portion of the container wall portion thereat, and the weld seam extends as a peripheral weld seam located at the resulting interface between the periphery of the flange portion and such adjacent marginal portion of the container wall portion.

23. Construction according to claim 15 wherein the container includes a tubular side wall and a pair of corresponding end walls, and the container wall portion having the spout aperture is located in one of the end walls.

24. Construction according to claim 15 wherein the container includes a tubular side wall and a pair of corresponding end walls, and the container wall portion having the spout aperture is located in the tubular side wall.

25. Construction according to claim 15 wherein a cooperating externally threaded closure element is operatively removably received in the internally threaded cylindrical portion of the spout member.

26. Method of forming a container closure spout construction according to claim 1 comprising arranging a closure spout member having a substantially axially extending tubular portion defining a closure spout opening adapted to receive removably a cooperating closure element thereat, with respect to a container wall portion having a spout aperture defined therethrough, such that the spout member is disposed at the spout aperture in engagement with the adjacent marginal portion of the container wall portion thereat, and applying a high energy concentration laser welding beam along the corresponding engagement portions thereof sufficient to produce a weld seam interconnecting the spout member with the container wall portion along such adjacent marginal portion.

27. Method according to claim 26 wherein the weld seam is produced as a continuous hermetically sealing weld seam forming a continuous fusion interconnection between the spout member and the container wall portion along such adjacent marginal portion.

28. Method according to claim 26 wherein the construction is in the form of a metal drum container closure spout construction having a container wall portion adapted to be incorporated in a corresponding metal drum container, and the weld seam is produced by subjecting the site of interconnection of the spout member with the container wall portion along such adjacent marginal portion to the operative action of a laser beam sufficient to form a corresponding metal weld seam bond thereat.

29. Method according to claim 28 wherein the container wall portion and closure spout member are formed of steel and the weld seam is a corresponding steel weld seam.

30. Method according to claim 28 wherein an indexing guide is provided on the closure spout member as a reference guide for applying the welding beam along the corresponding engagement portions to produce the weld seam.

* * * * *